US009789628B2

(12) United States Patent
Chun et al.

(10) Patent No.: US 9,789,628 B2
(45) Date of Patent: Oct. 17, 2017

(54) FAST RESPONSE TIME IN SLUMP MONITORING SYSTEMS

(71) Applicant: GCP Applied Technologies Inc., Cambridge, MA (US)

(72) Inventors: Byong-Wa Chun, Waban, MA (US); Kati Hazrati, Boston, MA (US); Eric P. Koehler, Boston, MA (US); Romain Faivre, Poznan (PL)

(73) Assignee: GCP Applied Technologies Inc., Cambridge, MA (US)

( * ) Notice: Subject to any disclaimer, the term of this patent is extended or adjusted under 35 U.S.C. 154(b) by 0 days.

(21) Appl. No.: 15/029,804

(22) PCT Filed: Sep. 30, 2014

(86) PCT No.: PCT/US2014/058295
§ 371 (c)(1),
(2) Date: Apr. 15, 2016

(87) PCT Pub. No.: WO2015/057380
PCT Pub. Date: Apr. 23, 2015

(65) Prior Publication Data
US 2016/0250775 A1 Sep. 1, 2016

Related U.S. Application Data

(60) Provisional application No. 61/892,709, filed on Oct. 18, 2013, provisional application No. 62/028,518, filed on Jul. 24, 2014.

(51) Int. Cl.
| | | |
|---|---|---|
| *B28C 7/02* | (2006.01) | |
| *B28C 7/12* | (2006.01) | |
| *C04B 26/18* | (2006.01) | |
| *C04B 28/02* | (2006.01) | |
| *C04B 40/00* | (2006.01) | |

(52) U.S. Cl.
CPC ............... *B28C 7/022* (2013.01); *B28C 7/12* (2013.01); *C04B 26/18* (2013.01); *C04B 28/02* (2013.01); *C04B 40/0096* (2013.01)

(58) Field of Classification Search
CPC ............ B28C 7/022; B28C 7/12; C04B 26/18
See application file for complete search history.

(56) References Cited

U.S. PATENT DOCUMENTS

| | | |
|---|---|---|
| 3,912,239 A | 10/1975 | Ries |
| 4,471,100 A | 9/1984 | Tsubakimoto et al. |
| 4,900,154 A | 2/1990 | Waitzinger |
| 4,906,298 A | 3/1990 | Natsuume et al. |
| 4,946,904 A | 8/1990 | Akimoto et al. |
| 5,100,984 A | 3/1992 | Burge et al. |
| 5,369,198 A | 11/1994 | Albrecht et al. |
| 5,393,343 A | 2/1995 | Darwin et al. |
| 5,713,663 A | 2/1998 | Zandberg |
| 5,925,184 A | 7/1999 | Hirata et al. |
| 5,948,970 A | 9/1999 | Te'eni |
| 6,227,039 B1 | 5/2001 | Te'eni |
| 6,352,952 B1 | 3/2002 | Jardine et al. |
| 6,376,581 B1 | 4/2002 | Tanaka et al. |
| 6,462,110 B2 | 10/2002 | Satoh et al. |
| 7,470,733 B2 | 12/2008 | Shirota et al. |
| 8,020,431 B2 | 9/2011 | Cooley et al. |
| 8,058,377 B1 | 11/2011 | Goc-Maciejewska et al. |
| 8,118,473 B2 | 2/2012 | Compton et al. |
| 8,311,678 B2 | 11/2012 | Koehler et al. |
| 8,491,717 B2 | 7/2013 | Koehler et al. |
| 8,960,990 B2 | 2/2015 | Koehler et al. |
| 2003/0172850 A1 | 9/2003 | Chun et al. |
| 2006/0293417 A1 | 12/2006 | Taniguchi et al. |
| 2007/0043190 A1* | 2/2007 | Kraus ................. C04B 24/2647 526/319 |
| 2008/0035022 A1 | 2/2008 | Hamada et al. |
| 2009/0037026 A1 | 2/2009 | Sostaric et al. |
| 2009/0258969 A1 | 10/2009 | Shimoda et al. |
| 2009/0312460 A1* | 12/2009 | Lorenz ................ C04B 24/2647 524/5 |
| 2011/0029134 A1* | 2/2011 | Hazrati ................... B28C 7/026 700/265 |
| 2011/0077778 A1 | 3/2011 | Berman |
| 2012/0204625 A1 | 8/2012 | Beaupre et al. |

FOREIGN PATENT DOCUMENTS

| | | |
|---|---|---|
| JP | 11-79811 | 3/1999 |
| JP | 2000327386 | 11/2000 |

OTHER PUBLICATIONS

Thomas, Form PCT/ISA/210, International Search Report for PCT/US2014/058295, dated Jan. 5, 2015, 2 pages.
Thomas, Form PCT/ISA/237, Written Opinion of the International Searching Authority for PCT/US2014/058295, dated Jan. 5, 2015, 6 pages.
Yamada, et al., "Controlling of the adsorption and dispersing force of polycarboxylate-type superplasticizer gby sulfate on concentration in aqueous phase", Cement and Concrete Research, 31(2001) 375-383.
Yoshioka, et al., "Adsorption characteristics of superplasticizers on cement component minerals", Cement and Concrete Research, 32(2002) 1507-1513.
Vickers Jr., et al., "Influence of dispersant structure and mixing speed on concrete slump retention", Cement and Concrete Research, 35(2005) 1882-1890.
Ferrari et al., Interaction of cement model systems with superplasticizers investigated by atomic force microscopy, zeta potential,and adsorption measurements, Journal of Colloid and Interface Science, 347(2010) 15-24.
Schröfl, et al., "Preferential adsorption of polycarboxylate superplasticizers on cement and silica fume in ultra-high performance concrete (UHPC)", Cement and Concrete Research, 42(2012) 1401-1408.

\* cited by examiner

*Primary Examiner* — Robert Harlan
(74) *Attorney, Agent, or Firm* — Craig K. Leon (57) ABSTRACT

The present invention provides a fast response method and system wherein one or more comb-type polycarboxylate ether (PCE) polymers, having a cumulative absorptivity coefficient in the range of 40%-75%, are employed as fluidizing admixtures dosed into concrete by and in automated slump monitoring and control systems which iteratively monitors and adjusts the slump of the concrete mix.

11 Claims, 7 Drawing Sheets

FAST RESPONSE TIME IN SLUMP MONITORING SYSTEMS

FIELD OF THE INVENTION

The present invention relates to manufacturing and processing of hydratable cementitious compositions such as concrete, and more particularly to a method and system for achieving fast response time using polycarboxylate ether polymer cement dispersants having cumulative absorptivity coefficient of 40%-75% and enabling slump monitoring systems to operate faster and more efficiently, particularly when operating in iterative modes that might otherwise degrade delivered concrete.

BACKGROUND OF THE INVENTION

The term "response time" as used herein refers to the mixing time or mixing energy necessary for obtaining a "target" slump (desired level or state of fluidity) of wet concrete in a rotatable mixer drum. The response time is frequently described in terms of the number of mixer drum revolutions required for the wet concrete to obtain a target slump after a fluidizing admixture is dispensed into the mixer drum.

A ready-mix concrete delivery truck may need to rotate the mixer drum 15-20 revolutions or more in order to mix water or naphthalene sulfonate type dispersants uniformly throughout a concrete load before the target slump is attained. Polycarboxylate type superplasticizers may require 50-70 or more revolutions of the concrete mixer drum before attaining complete and uniform dispersal within the concrete mix load. This behavior requires considerable planning and foresight in delivering concrete having a desired slump at the pour event.

While the concrete delivery truck is travelling on the road to the pour site, the maximum revolutions per minute (rpm) of the mixer drum is about 4-5 rpm. When the truck is stationary (parked), the loaded concrete mixer drum can rotate at a maximum rate of around 20-40 rpm. If one seeks to reach a target slump (a specified slump level) during travel and before the mix load reaches the pour site, one may need to introduce a polycarboxylate superplasticizer into the concrete mixer drum about 20 minutes or more before arriving at the construction/pour site in order to have sufficient processing time for reaching the target slump. Alternatively, when the mixer truck arrives at the construction/pour site, the admixture can be introduced into the concrete and the mixer drum rate can stepped up to 20-40 rpm while the truck is parked so that the fluidizing admixture can be mixed dispersed uniformly throughout the load, theoretically, within minutes.

However, concrete delivery trucks typically require 50-70 rotations of the mixer drum, or more, before an accurate slump measurement is obtained, in accordance with current practice. Before on-board slump monitoring systems were available, concrete slump was measured using the standard slump cone procedure on mix sample taken from the mixer. The use of slump cone measurement on the job site is still the usual practice, as the industry grapples with the number of variables—temperature, moisture and humidity, environment, quality of day to day materials—which can defeat accurate monitoring and chemical dosing even when automated slump monitoring systems are used.

In U.S. Pat. No. 8,058,377 B1 which issued on Nov. 14, 2011, and which is owned by the common assignee hereof, Goc-Maciewjeska et al. disclosed phosphate-containing polycarboxylate polymer dispersants which contained mono-ester, di-ester, and tri-ester groups in specific molar ratios for achieving "quick mix-in dispersibility" in comparison with polycarboxylate polymer dispersants that did not contain phosphate groups. Such phosphate-containing polymers conferred improved "initial" slump as well as slump "retention" to the concrete mix. Goc-Maciewjeska et al. believed that the mix dispersibility of these polymers would be "particularly useful in ready-mix delivery trucks or in plant batching operations whereby "time can be saved by the ability of the polymer dispersant to become uniformly distributed throughout a concrete mix in less time compared to polycarboxylate polymers that do not contain phosphate groups" (See U.S. Pat. No. 8,058,377 at col. 2, ll. 23-29).

Goc-Maciewjeska et al. explained that this "relatively quicker mix dispersibility will be highly useful in automated mixer systems wherein the slump of concrete is monitored within a rotating drum mixer and adjusted by dosing a rheology-modifying agent (e.g., chemical admixture such as a water reducer or superplasticizer) into the mix." (See U.S. Pat. No. 8,058,377 at column 2, lines 30-35). They further explained that after dosing the admixture and mixing the concrete, the energy required to turn the mixer is monitored until the energy curve flattens over time, thereby indicating that the dose has been uniformly dispersed within the mix. They found that certain phosphate-containing polymers dispersed more quickly in the concrete mix compared to polycarboxylate polymers that did not contain such phosphate groups, thereby shortening the time needed in automated slump monitoring operations. (See U.S. Pat. No. 8,058,377 at column 2, lines 35-42).

There is a need for fast response ("mix-in" dispersibility) time for polycarboxylate fluidizing polymers used in automated systems that measure the energy required to turn the rotatable mixer drum until the energy curve flattens over time (thereby indicating that the admixture dose is uniformly dispersed within the mix), because dosing and monitoring are performed in an iterative fashion that extends the theoretical mix-in time for dosing fluidizing admixture into concrete. A first admixture dose is dispensed into the concrete, and slump is monitored by the automated system over time (i.e., over a number of mixer drum revolutions) and then the slump data readings are compared to pre-recorded data stored in processor-accessible memory; and then one or more subsequent doses of the fluidizing admixture are dispensed into the concrete where discrepancy is detected by the system between actual and target slump levels; and then the concrete load is again monitored over further drum revolutions until target slump is attained. If a sufficient discrepancy continues to exist, the process can be repeated one or more times. Such automated slump monitoring systems are disclosed, for example, in U.S. Pat. Nos. 8,311,678 and 8,491,717 (Verifi, LLC), incorporated herein by reference.

"Response time" has not merited serious consideration as a primary or even desirable attribute of comb-shaped polycarboxylate ether ("PCE") cement dispersants until the present invention.

It is thus an objective of the present invention to provide a method and system for achieving fast response time using one or more polycarboxylate ether polymer cement dispersants having a cumulative absorptivity coefficient of 40%-75%, thereby enabling slump monitoring systems to operate faster and more efficiently. Because automated slump monitoring systems must sample the concrete by rotating the drum a number of times to sample the energy required to rotate the drum and translate this into slump reading, and then rotate the drum a number of times to mix in a fluidizing admixture, the numerous drum revolutions can entrain too much air into the concrete mix and can also overheat the cement due to the grinding action of the aggregates. Thus, for the present inventors, achieving a fast response time is particularly desirable when the slump monitoring system must operate in iterative fashion (monitoring, adjusting slump, monitoring, adjusting slump, etc.) that might otherwise tend to degrade the delivered concrete.

SUMMARY OF THE INVENTION

The present invention provides a method and system for achieving fast response using a chemical fluidizing admixture comprising at least one and possibly two or more comb-type polycarboxylate ether polymer or polymers (hereinafter "PCE") as the primary cement-dispersant components, dosed into concrete using an automated slump monitoring system.

The present inventors surprisingly discovered that fast response mix-in dispersibility can be achieved using PCE(s) having a cumulative absorptivity coefficient ("$A_c$") of 40%-75% (as measured at 25 degrees Celcius) when mixed into a cement mortar sample at 120 seconds after mixing to obtain an aqueous cementitious slurry wherein the water/cement ratio is 0.4 and total amount of PCE(s) dosed into cement is 0.03%-0.5% dry weight based on weight of the cement, the dosage of PCE(s) being determined by a mortar test whereby PCE dosage administered is equivalent to that which achieves 14% water reduction in the cementitious mix. In other words, the amount of the PCE polymer(s) used is that which would achieve the equivalent fluidity enhancement as by adding 14% additional water into the cementitious mix.

The use of substantially less than optimal PCE absorptivity is surprising and counter-intuitive because conventional thinking is that PCEs having the fastest response time would be those polymers that attach to cement particles most aggressively. It was previously thought that comb-type PCEs, especially, with their adsorbing backbone units and hydrophilic polyoxyethylene side chains (or "teeth"), should work to disperse particles most expeditiously if they adhered aggressively at the cement solids-liquid interface to alter initial slump by using the hydrophilic groups to create repulsion within the particle-water mixture, thus achieving fluidity within the concrete and at the same time reducing the water/cement ratio.

Unexpectedly, the present inventors discovered that fast response in terms of quick mix-in of the PCEs within concrete is most ideally accomplished not by using the PCEs having the fastest impact on initial slump, but by using PCEs that hitherto might be considered to impart a "long term" slump enhancing effect. In other words, the polymers that worked best to achieve fast response are those which tended to enhance or to retain slump rather than those which affected initial slump behavior.

The present inventors believe that for fast response using automated slump monitoring systems the PCEs should have less than 75 percent cumulative absorptivity coefficient ("$A_c$") with respect to the cement particles in the concrete (when quantified by adsorption analytical methodologies that are known and described in detail hereinafter).

Thus, an exemplary system of the present invention for achieving fast response time of chemical fluidizing admixture in a hydratable cementitious mix, comprises: a rotatable mixer drum for containing a hydratable concrete mix; a system for continuous monitoring of slump of the hydratable concrete mix contained in the rotatable mixer drum and for dispensing controlled amounts of fluidizing chemical admixture into the concrete mix within the drum based on the continuous monitoring; and a fluidizing chemical admixture to be dispensed by the system into the hydratable concrete mix contained in the rotatable mixer drum, the admixture comprising at least one comb-type polycarboxylate ether polymer for modifying slump of the concrete mix (the one or more comb-type polycarboxylate ether polymer or polymers being hereinafter referred to as "PCE"), the PCE having a cumulative absorptivity coefficient ($A_c$) of 40%-75% as determined by a depletion method whereby a sample of the PCE was in an aqueous cement slurry containing the cement used for making the hydratable concrete mix, the aqueous cement slurry being separated after 120 seconds mixing of the PCE-containing aqueous cement slurry to obtain supernatant pore water, in accordance with the formula $A_c=[(A-B)/A]\times 100$, wherein "A" represents the total amount of PCE added to the aqueous cement slurry before separation to obtain the supernatant pore water, "B" represents the amount of the PCE remaining in the supernatant pore water obtained by separation from the aqueous cement slurry after 120 seconds mixing, and wherein absorptivity is measured at 25° Celcius on the supernatant pore water separated from the aqueous cement slurry after 120 seconds mixing of the aqueous cementitious slurry containing the cement, water, and PCE, wherein water/cement ratio of the slurry is 0.4 and the amount of the PCE dosed into the aqueous cementitious slurry is between 0.03%-0.5% by dry weight based on cement and is calculated by mortar test whereby dosage for the PCE is that which would provide the same fluidity as adding 14% additional water into the aqueous cementitious slurry.

Accordingly, an exemplary method of the present invention achieving fast response time of a polycarboxylate ether polymer in a concrete mix, comprises: providing a rotatable mixer drum for containing a hydratable concrete mix; providing a system for continuous monitoring of slump of the hydratable concrete mix contained in the rotatable mixer drum and for dispensing controlled amounts of fluidizing chemical admixture into the concrete mix within the drum based on the continuous monitoring; and providing a fluidizing chemical admixture to be dispensed by the system, the admixture comprising at least one comb-type polycarboxylate ether polymer for modifying slump of the concrete mix (the one or more comb-type polycarboxylate ether polymer or polymers being hereinafter referred to as "PCE"), the PCE having a cumulative absorptivity coefficient ($A_c$) of 40%-75% as determined by a depletion method whereby a sample of the PCE is charged into an aqueous cement slurry containing the cement used for making the hydratable concrete mix, and mixed together and separated after 120 seconds continuous mixing of the aqueous cement slurry to obtain supernatant pore water, in accordance with the formula $A_c=[(A-B)/A]\times 100$, wherein "A" represents the total amount of PCE added to the aqueous cement slurry which was then separated to obtain the supernatant pore water, "B" represents the amount of the PCE remaining in the supernatant pore water obtained by separation from the aqueous cement slurry, and wherein absorptivity is measured at 25° Celcius on the supernatant pore water separated from the aqueous cement slurry after 120 seconds continuous mixing of the aqueous cementitious slurry containing the cement, water, and PCE, wherein water/cement ratio of the slurry is 0.4 and the amount of the PCE dosed into the aqueous cementitious slurry is between 0.03%-0.5% by dry weight based on cement and PCE dosage used is calculated by mortar test whereby dosage for the PCE is that which would provide the same fluidity as adding 14% additional water into the aqueous cementitious slurry.

The laboratory equipment needed for mixing samples of the PCE into cementitious slurry, for separating supernatant pore water (e.g., filter), and for determining the amount of PCE in the supernatant is readily available and straightforward in terms of implementation.

The automated slump monitoring systems contemplated for use in exemplary systems and methods of the invention are commercially available and are also relatively straightforward in terms of usage. Preferably, the systems are installed on concrete delivery trucks and have at least one sensor for measuring energy required to rotate the concrete mixer drum and at least one sensor for measuring mixing rotational speed of the mixer drum, and preferably the slump monitoring system is programmed to monitor on a relatively continuous basis and to adjust slump by introducing fluidizing chemical admixture into the concrete load, and, if necessary, to repeat the monitoring and adjustment steps in iterative fashion during transit and/or after arrival at the delivery/pour site.

In further exemplary embodiments, the automated slump monitoring systems can employ sensors which are rheological probe units immersed into the concrete or mortar contained in the mixer drum, and which measure at least one value indicative of a rheological property of the concrete or mortar (e.g., slump, slump flow, yield stress, viscosity, etc.). Preferably, such probe units are mounted onto an inner wall and/or mixing blade within the mixer drum.

Further advantages and features of the present invention may be described in further detail hereinafter.

BRIEF DESCRIPTION OF DRAWING

An appreciation of the benefits and features of the present invention may be more readily comprehended by considering the following written description of preferred embodiments in conjunction with the drawings, wherein.

DETAILED DESCRIPTION OF PREFERRED EMBODIMENTS

Automated monitoring systems for monitoring and adjusting one or more properties of concrete, such as slump, are contemplated for use in the present invention. These include the type of monitoring systems which measure the energy or hydraulic pressure required to rotate the mixer drum containing the concrete and correlate these to the rheological property (e.g., slump) being monitored. These also include the type of monitoring systems which employ probes or load cell sensors which are attached to the inner wall of the concrete mixer drum and/or to mixer blades mounted upon the inner wall of the concrete mixer drum.

Exemplary monitoring systems for measuring the hydraulic pressure required to rotate the concrete mixer drum slump are commercially available from Verifi LLC, 9466 Meridian Way, West Chester, Ohio USA, and also 62 Whittemore Avenue, Cambridge, Mass. USA. Slump monitoring systems of the VERIFI® type are variously disclosed in patent literature authored by Verifi LLC. These include U.S. Pat. No. 8,118,473 of Compton et al.; U.S. Pat. No. 8,020,431 of Cooley et al.; U.S. Pat. No. 8,491,717 of Koehler et al.; U.S. Ser. No. 10/599,130 of Cooley et al. (Publ. No. US 2007/70185636 A1); U.S. Ser. No. 11/834,002 of Sostaric et al. (Publ. No. US 2009/0037026 A1); and U.S. Pat. No. 258,103 of Koehler et al. (Publ. No. 2012/0016523 A1), all of which are incorporated by reference herein. In U.S. Pat. No. 8,491,717, Koehler et al. taught that the slump monitoring system could track dosage of both PCE cement dispersants as well as air control agents (air entraining and/or detraining agents) based on nominal dosage profiles which were stored in memory.

Exemplary monitoring systems which employ a probe or other electromechanical sensor for sensing the force applied by concrete on the probe or sensor are also believed to be suitable for use in the present invention. For example, US Publication No. 2012/0204625 A1 (application Ser. No. 13/500,643), of Beaupre et al. (assigned to I.B.B. Rheologie Inc.) disclosed a probe, installed on the hatch of the ready mix truck's drum, which comes into contact with the concrete and measures the resistance pressure imparted by the concrete. The values or derivative values obtained from the sensor readings can be used to calculate at least one rheological property of the concrete contained and rotated within a mixing drum. Hence, the present inventors believe that electromechanical sensors or probes can also be employed within automated monitoring systems suitable for use in the present invention.

Another concrete slump measurement and control system is disclosed in US Publication No. 2011/0077778 A1 of Bertold Berman (assigned to Dully Datzeff-Berman). See also WO 2009/144523. Berman discloses an apparatus and method to measure and control the slump of concrete by using a monitoring sensor within the interior surface of the concrete mixer. The Berman apparatus and method involves controlling the mixing and slump by use of sensors which measure the force applied by concrete either as pressure or stress at the inner surface of the mixer. Berman alleges that the pressure or stress on the sensors is directly related to the slump value. Thus, by monitoring the forces on the sensors, the desired concrete mix slump can be obtained. Accordingly, Berman teaches that the required additional liquid or solids can be added to match the forces on the sensor and therefore the desired slump. The Berman apparatus is believed to be commercially available from Sensocrete of Saint Lazare, Quebec, Canada, under the brand name Concrete Optimizer™.

Another exemplary electromechanical device for monitoring the mixing of concrete which is believed by the present inventors to be suitable for use in the present invention is disclosed in European Patent Application No. EP 1 961 538 A2 of Eugenio Bonilla Benegas (Application No. 06847054.1). Similar to the Sensocrete system, the Benegas automatic monitoring system employs a sensor which rotates integrally with the concrete mixer drum, but the Benegas sensor is attached or connected to the mixing blade and is sensitive to the stresses exerted by the concrete or mortar upon the blade, and values sensed by the sensor can be communicated by means of radio communication or other similar wireless communication means, to another location spaced away from the sensor.

Hence, exemplary automated monitoring systems of the systems and methods of the present invention are selected from the group consisting of energy sensors (e.g., hydraulic pressure sensor for sensing the hydraulic pressure required to rotate the mixer drum) as well as electro-mechanical probes or sensors which detect pressure or stress exerted by the moving concrete being rotated within the mixer drum. In either case, the signal values emitted by these various sensor types can be fed to a processor unit to provide an indication of or signal correlating to a rheological property of the mix contained within the mixer drum.

The foregoing automated monitoring systems can incorporate or be employed in combination with other sensors, such as temperature sensors, to provide various additional values which can be taken into consideration while monitoring and adjusting the concrete during transit.

Thus, a variety of automated monitoring systems and devices are believed by the present inventors to be suitable for use in the present invention, and the teachings of the various publications mentioned above are incorporated herein by reference as if fully set forth herein. Thus, while specific reference may be made to the use of hydraulic pressure sensors herein as a currently preferred mode for correlating sensed values to one or more properties of concrete or mortar contained in the concrete mixer drum, it will be understood that electromechanical sensors can be substituted for the hydraulic pressure value readings which can be correlated to one or more concrete or mortar properties, such as slump, slump flow, yield stress, viscosity, and/or other properties of the mix.

Figure 1:
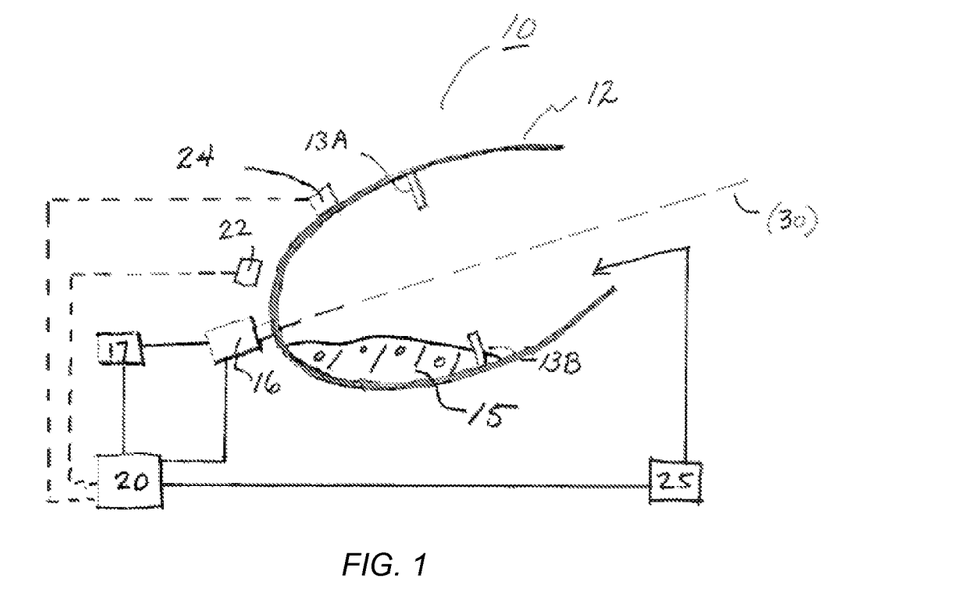
FIG. 1 is a schematic diagram of an exemplary system and method of the invention for achieving fast response using one or more cement-dispersing, comb-type polycarboxylate ether polymers ("PCE") having a cumulative absorptivity coefficient ($A_c$) of 40%-75% within a wet concrete mix load monitored by automated slump monitoring and control system.

As illustrated in FIG. 1, an exemplary and method of the present invention for achieving fast response time comprises a rotatable concrete mixer drum 12 having at least one, and more preferably at least two, mixer blades (13A and 13B) mounted on the inner wall of the mixer drum 12 and arranged generally in a spiral or helical fashion around the mixer drum 12 rotational axis which is designated by the dashed line (as at 30). The mixer drum 12 is rotatably mounted on a concrete delivery vehicle (not shown). The mixer drum 12 should have a capacity to hold up to 10 cubic yards or more of fresh concrete 15. The system 10 further comprises a motor drive assembly (such as a hydraulic pressure-driven motor or pump drive assembly that is designated at 16) or other type of engine or pump assembly for rotating the mixer drum 12 containing the concrete, and further comprises a sensor, such as a hydraulic sensor 17, coupled to the engine or pump 16 for monitoring the energy required to rotate the mixer drum 12. A computer processor unit 20 can be coupled or wirelessly connected to the hydraulic sensor 17 as well as to a second sensor 22 for sensing the rotational speed of the mixer drum 12, and to a device such as a pump, valve, or other dispensing device for dispensing chemical admixture (designated as at 25) into the concrete mix 15 contained within the mixer drum 12 upon signal or other instruction from the processor unit 20.

While the mixer drum 12, hydraulic motor assembly 16, and hydraulic sensor 17, and chemical admixture and pump device (generally designated at 25) is understood to be located on a concrete delivery truck (not shown), it is understood that the computer processor 20 may be located on the truck or elsewhere, such as at a remote location, and that instead of wires it is possible that transmitters and receivers can be used for wirelessly connecting various components of the system 10, such as speed sensor 22, accelerometer 24, or other sensors to processor units.

Thus, in an alternative exemplary embodiment, an accelerometer sensor 24 mounted on the outer mixer drum 12 surface can be coupled to a wireless transmitter (not shown) to transmit signals from the accelerometer sensor 24 to the processor unit 20 to provide signals which can be converted by the processor unit 20 to obtain the rotational speed of the mixer drum 12. In a further embodiment, the accelerometer sensor 24 can be coupled or integrated with a separate processor unit and wireless transmitter (not shown) to calculate and to transmit data representing the rotational speed of the mixer drum 12 to the computer processor unit 20 or to another processor that is not located on the concrete delivery vehicle.

The computer processor unit 20 is coupled and/or wirelessly connected to an accessible memory unit or units that contain data for correlating admixture amounts and their effects on slump, whereby current slump can be adjusted to or towards target slump. The Verifi patents referenced above contain instrumental teachings in this regard, though none of them address or foresee the benefits to be obtained by using PCEs within a specific cumulative absorptivity coefficient range as taught by the present invention.

Figure 2:
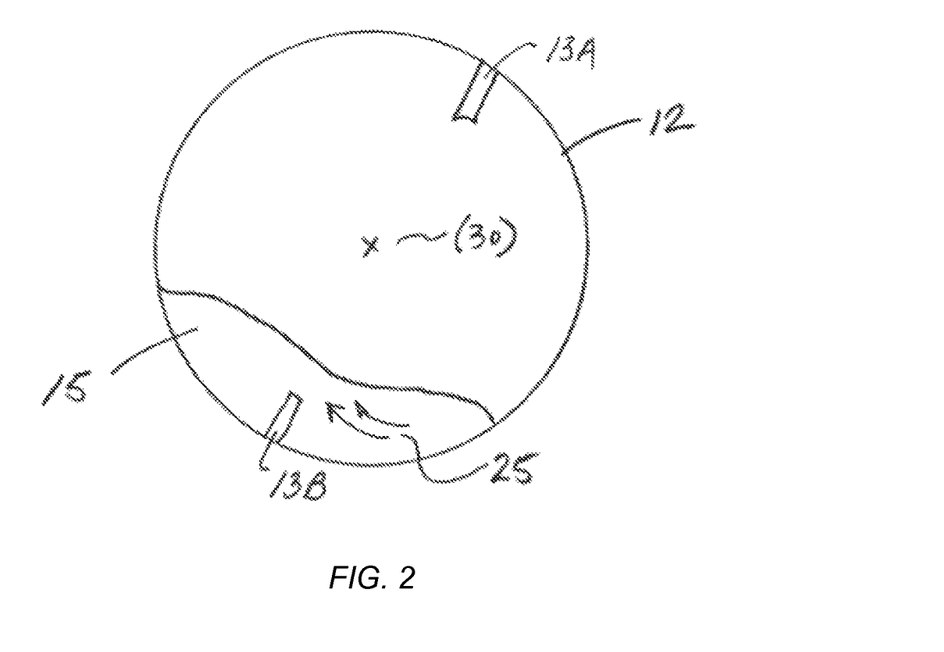
FIG. 2 is a plan view taken along rotational axis of the exemplary rotatable mixer drum of FIG. 1 containing a concrete mix containing PCE cement dispersant.

As illustrated by the perspective FIG. 2 taken along the rotational axis of the concrete mixer drum 12, the concrete mix 15 is mixed by the rotating action of the rotating drum 12 and mixer blades 13A and 13B about the rotational axis (30), the fluidizing chemical admixture (designated as at 25) comprises one or more cement-dispersing, comb-type polycarboxylate ether polymers ("PCE") which have a cumulative absorptivity coefficient of 40%-75% based on the cement which constitutes the concrete mix 15 in the mixer drum 12. The term "absorptivity" refers to the ability of the PCE to adhere to hydratable cement particles within the cement particle-water suspension, and the concept of cumulative absorptivity coefficient will be explained in further detail hereinafter.

The actual fundamental working mechanism by which PCEs adhere or attach to cement particles is not completely understood. It is thought that such mechanism is based on the interaction between the anionic nature of the PCE polymer and the cationic nature of calcium ion at the surfaces of the suspended cement particles in combination with the other entropic terms of the suspension system containing PCE molecules. The comb-type PCEs are characterized by adsorbing backbone unit and a hydrophilic polyethylene oxide side chain (or "teeth"), such that when PCEs are adsorbed at the liquid-solid interface in a particle suspension (as previously summarized), the PCEs induce a repulsive inter-particle force that avoids the formation of agglomerates and hence allows flow properties while reducing the water/cement ratio in the cementitious composition. See e.g., Lucia Ferrari et al., "Interaction of Cement Model Systems with Superplasticizers Investigated by Atomic Force Microscopy, Zeta Potential, and Adsorption Measurement," *Journal of Colloid and Interface Science* 347 (2010) 15-24 (available online 7 Mar. 2010).

The term "cement" as used for describing the present invention includes hydratable cement such as Portland cement which is produced by pulverizing clinker consisting of hydraulic calcium silicates, aluminates and aluminoferrites, and one or more forms of calcium sulfate (e.g., gypsum) as an interground additive. Typically, Portland cement is combined with one or more supplemental cementitious materials, such as fly ash, granulated blast furnace slag, limestone, natural pozzolans, or mixtures thereof, and provided as a blend. Thus, the term "cement" may also include supplemental cementitious materials which have been inter-ground with Portland cement during manufacture.

The term "cementitious" may be used herein to refer to materials that comprise Portland cement or which otherwise function as a binder to hold together fine aggregates (e.g., sand), coarse aggregates (e.g., crushed gravel), or mixtures thereof, in concrete and mortar.

The term "hydratable" as used herein is intended to refer to cement or cementitious materials that are hardened by chemical interaction with water. Portland cement clinker is a partially fused mass primarily composed of hydratable calcium silicates. The calcium silicates are essentially a mixture of tricalcium silicate ($3CaO.SiO_2$ or "$C_3S$" in cement chemists' notation) and dicalcium silicate ($2CaO.SiO_2$, "$C_2S$") in which the former is the dominant form, with lesser amounts of tricalcium aluminate ($3CaO.Al_2O_3$, "$C_3A$") and tetracalcium aluminoferrite ($4CaO.Al_2O_3.Fe_2O_3$, "$C_4AF$"). See e.g., Dodson, Vance H., Concrete Admixtures (Van Nostrand Reinhold, New York, N.Y. 1990), page 1.

The term "concrete" will be used herein generally to refer to hydratable cementitious mixtures comprising cement, sand, and usually a coarse aggregate such as crushed stone or gravel, and optionally a chemical admixture such as one or more chemical admixtures (e.g., one or more PCEs).

The phrase "cumulative absorptivity coefficient" (designated as $A_c$) as used herein means and refers to the absorptivity of one or more comb-type PCEs on the hydratable cement which is used to make the wet concrete or other cementitious mix (e.g., mortar) being delivered by truck to the construction/pour site. Thus, the present inventors believe that using the teachings of the present invention, it may be possible to combine PCE polymer or polymers which may have extremely high $A_c$ value (over 75%) with PCE polymer or polymers which may have extremely low $A_c$ value (under 40%) to achieve a cumulative absorptivity coefficient ($A_c$) within the present invention (i.e., 40%-75%).

Figure 3:
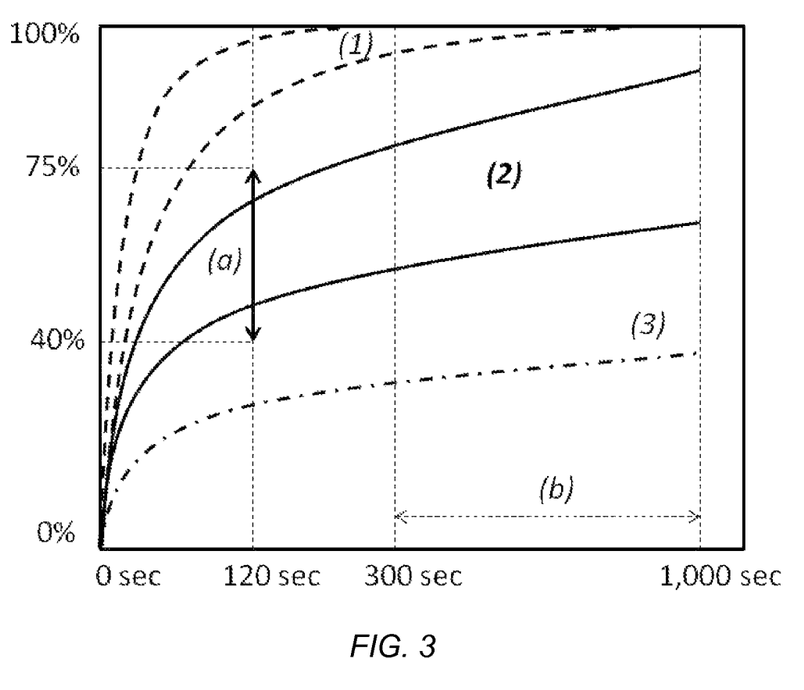
FIG. 3 is a graph illustrating the present invention, whereby a laboratory sample of fluidizing PCE cement dispersant at 120 seconds after mixing (horizontal axis shows mixing time), as designated by the double arrow at "(a)," has a cumulative absorptivity coefficient of 40%-75% (vertical axis shows adsorption coefficient or percentage on cement in a mortar sample mix), and the behavior over time of such PCE is plotted using solid lines (defining area designated "2"; and this is compared to polymer behavior (indicated using dashed or discontinuous lines) of polymers having absorptivity behavior which is either too slow ("3") or too fast ("1")

As previously mentioned, FIG. 3 graphically illustrates the absorptivity behavior of a sample PCE polymer cement dispersant as a function of mixing time. The horizontal axis indicates mixing time beginning from when the sample mortar cement, water, and PCE dispersant(s) are completely mixed together, and the vertical axis indicates the percentage absorptivity behavior of the PCE on the cement. The cumulative absorptivity coefficient ($A_c$) range of 40%-75% is designated by the double arrow at "(a)" which coincides with the 120 second mark (along the horizontal time axis).

The behavior over time of a PC-based polymer cement dispersant having features of the present invention is plotted over time using solid connected lines, which define a space designated by the "(2)" which appears in FIG. 3 between 300 seconds and 1,000 seconds after mixing. The present inventors believe that it is helpful to think about the behavior of the sample PCE-containing cement sample mix at 300 seconds, as this corresponds to real world mixing of a corresponding concrete after about 20 revolutions of a concrete mixer drum on a delivery truck; and it is helpful to think about the behavior of the PCE-containing cement sample mix at 1,000 seconds, as this corresponds to real world mixing of a corresponding concrete after about 70 revolutions of a concrete mixer drum on a delivery truck, which is often considered the ideal time or deadline by which an actual delivered concrete mix load should be discharged (poured) from the truck at the construction site.

In contrast to PCE having $A_c$ value between 40%-75% as contemplated by the present inventors, FIG. 3 also illustrates the absorptivity behavior of PCE polymer(s) which are considered to be too fast at 120 seconds such that the PCE is not available to affect slump of the concrete subsequently during the 300-1,000 seconds of (laboratory sample) mixing period which was chosen by the present inventors as an approximation of 20-70 revolutions of the concrete mixer drum in the real world delivery situation; and this is designated at "(1)" in FIG. 3. Also illustrated in FIG. 3 is the absorptivity rate of PCE polymer which considered to be too slow at 120 seconds after continuous mixing of the PCE/cement/water sample mix, such that it does not affect the concrete slump at a later stage (e.g., during the 300 second to 1,000 second time period continuous mixing of sample which approximates 20-70 revolutions of the corresponding concrete being mixed in a mixer drum in the real world delivery transit situation); and this is designated at "(1)" in FIG. 3. In contrast, the present inventors have set the boundaries of their ideal cumulative absorptivity coefficient ($A_c$) of the PCE polymer(s) at 40%-70% which corresponds to the absorptivity coefficient of the PCE(s) dispersant polymer, at 25 degrees Celcius and 120 seconds after continuous mixing, as represented by the letter "(a)" in FIG. 3.

The $A_c$ value may be measured in the laboratory using a depletion method. First, a sample (16 gm cement within 6.4 gm of admixture water solution) is charged into a glass tube in the amount of 0.03-0.2 percent based on dry weight cement. The tube is agitated thoroughly for two minutes (using test tube agitator or mixer device) and 2 grams of supernatant (pore water) is filtered out by using 0.45 micrometer filter and accurately weighed on a scale. Thereafter, 2 grams of hydrochloric acid (0.8%) is added to the supernatant. Then, deionized water is added to obtain 40 grams total of a diluted liquid pore water sample.

The cumulative absorptivity coefficient ($A_c$) is calculated using the formula $$A_c = [(A-B)/A] \times 100$$

where A represents the total amount of comb-type polycarboxylate ether polymer or polymers (PCE) added to cement slurry which is then filtered, B represents the amount of PCE remaining in the pore water obtained through filtration, and where the filtration and absorptivity measurement is carried out at room temperature (25 degrees Celsius) using analytical equipment capable of measuring the concentration of the PCE in the pore water. Such analytical equipment may include equipment that measures Total Organic Content (TOC), size exclusion chromatography (GPC) equipment, and reflective index detector. The water-to-cement ratio of the sample is 0.4, and the amount of polymer used will be between 0.03-0.5% based on dry weight cement as determined by standard mortar test; namely, the amount of polymer that would be required to provide a mortar with the same fluidity equivalent to adding 14% additional water into the mortar mix (i.e., for achieving 14% water cut).

Figure 4:
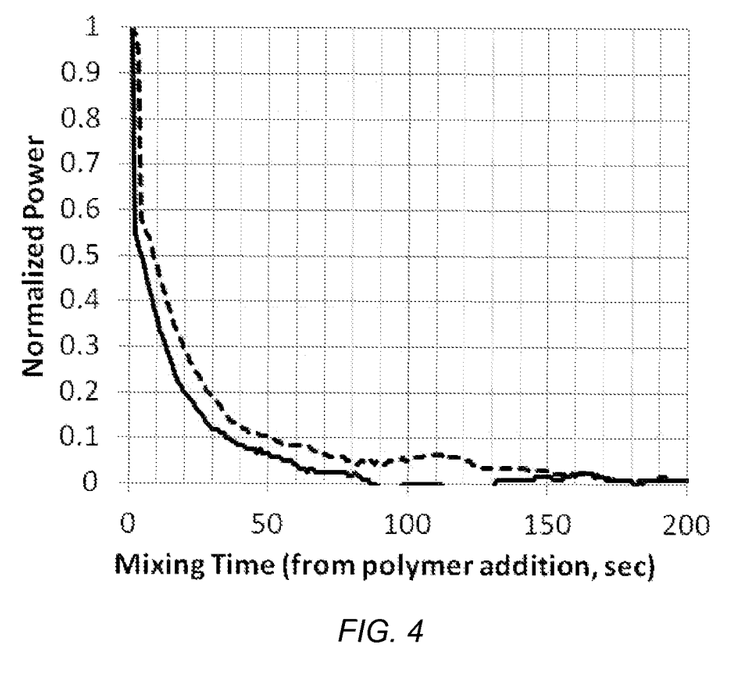
FIG. 4 is a graph which illustrates the concept of "response time" by using an equivalent cement mortar test data with a mortar mixer, whereby the effects of fluidizing PCE admixtures introduced into the concrete contained in a rotatable concrete mix drum are illustrated in terms of the mixer power required to rotate the drum over time (seconds of mixing time starting from the addition of the PCE polymer admixture)

FIG. 4 is another graphic illustration of the response time concept, this time as measured by measuring the energy required to rotate a Hobart mixer to which a commercially available power consumption meter was attached. The data plotted in FIG. 4 was obtained on subsequent days (January 19 and 20, 2012) to confirm reproducibility of the data results.

Figure 5:
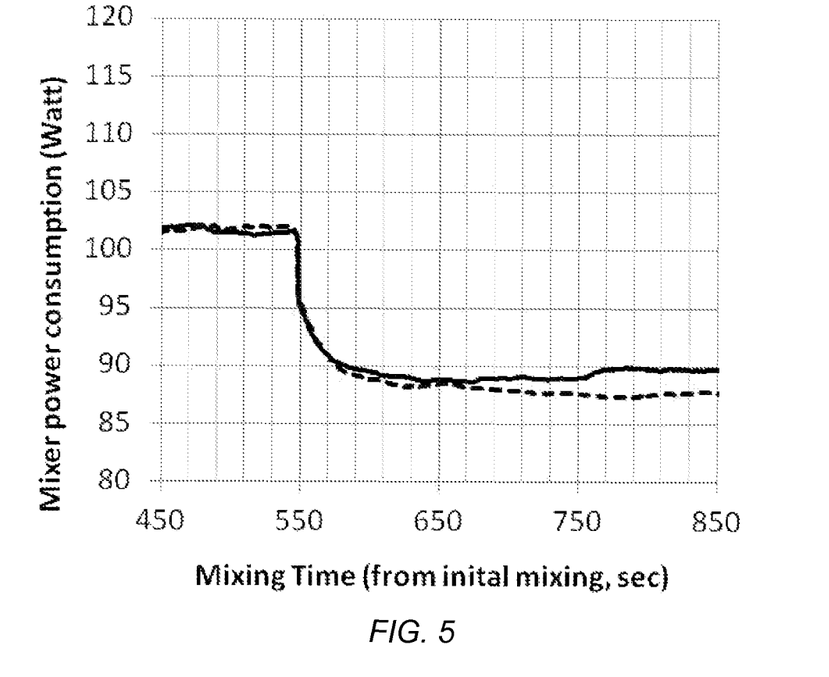
FIG. 5 is a graph illustrating motor power change by the additions of PCE polymer cement dispersants.

FIG. 5 graphically illustrates the change in energy required by the motor of the Hobart mixer by the addition of the PCE dispersant into the cementitious mix contained in Hobart mixer. It can be seen that the energy required to mix the sample stabilized after 550 seconds of mixing time after the PCE was introduced into the cement-containing sample. The power required to mix the concrete decreased from about 102-103 Watts to below 90 watts after about 100 seconds. Thus, about 14 to 15 watts power reduction was attained by using 0.11 wt. % addition of PCE into the sample cement mortar (though it should be acknowledged that actual power consumption and power reduction may significantly vary depending on type of mixer employed). After normalization of the power curve, by setting starting mixer power at 1 and final mixer power at zero (0) as shown in FIG. 4, a 90% power reduction point was calculated and the time at the point where the energy curve meets the 0.1 level, corresponding to the 90% reduction point, is defined as the "response time." The drop in mixer power shown by the downward curve illustrated after 550 seconds in FIG. 5 suggests that response time was 35-50 seconds.

Various polycarboxylate ether polymer (PCE) molecules were synthesized, and their polymer structures were analyzed in order to obtain some understanding about PCE structures and their correspondence if any to response time. In Table 1 shown below, the present inventors characterize various polymers, including characterization through the use of polymer absorption by the Total Organic Carbon (TOC) method, and examine the dosage required for obtaining 14 Watt reduction in the energy required to mix the concrete. Table 1 summarizes the response time results. The results include response times which range from 15 to 100 seconds in terms of reducing the mixing time. The present inventors analyzed the data and discovered that various factors, including required dosage for achieving target fluidity, the PEG (polyethylene glycol) side chain length, the peak molecular weight as determined by Gel Permeation Chromatography (GPC), the adsorption isotherm of the PCE polymer and extent of cross-linking, all strongly influence response time of the polymer.

TABLE 1

Characterization and Response Time Results of Various PCE Polymers

| Sample ID | Crosslink Amount | PEG Teeth MW | Acid/PEG ratio | MW Main Peak | Dose for 14 W Reduction (% s/s) | % Adsorbed at the dose | 90% Power Reduction (sec) |
|---|---|---|---|---|---|---|---|
| 19181-101 | 0.00 | 1100 | 6.9 | 9,320 | 0.12 | 57.9 | 48 |
| 19181-103 | 0.83 | 1100 | 6.9 | 8,296 | 0.12 | 62.2 | 31 |
| 19181-109 | 1.60 | 1100 | 6.9 | 11,144 | 0.12 | 57.4 | 53 |
| 19181-110 | 0.00 | 1100 | 10 | 9,779 | 0.12 | 58.4 | 20 |
| 19181-111 | 1.60 | 1100 | 10 | 7,963 | 0.12 | 63.8 | 15 |
| 19213-172B | 0.00 | 1100 | 2 | 9,993 | 0.15 | 37.9 | 37 |
| 19213-175B | 1.50 | 1100 | 2 | 10,353 | 0.15 | 39.2 | 29 |
| 19213-177B | 6.00 | 1100 | 2 | 11,715 | 0.15 | 33.8 | 17 |
| 19213-178A | 10.00 | 1100 | 2 | 15,327 | 0.15 | 29.8 | 38 |
| 19213-180B | 0.00 | 950 | 2 | 12,311 | 0.09 | 72.3 | 18 |
| 19213-181A | 3.00 | 950 | 2 | 15,500 | 0.11 | 59.9 | 16 |
| 19213-185A | 6.00 | 950 | 2 | 15,628 | 0.13 | 49.9 | 25 |
| 19213-186A | 6.00 | 950 | 2 | 29,264 | 0.09 | 65.5 | 18 |
| 19213-170A | 0.00 | 2080 | 5 | 12,900 | 0.08 | 76.9 | 50 |
| 19269-30B | 0.00 | 2080 | 5 | 17,686 | 0.11 | 76.9 | 45 |
| 19213-186B | 1.50 | 2080 | 5 | 14,400 | 0.1 | 67.0 | 19 |
| 19213-188A | 1.50 | 2080 | 5 | 24,000 | 0.105 | 81.6 | 36 |
| 19269-34B | 0.00 | 950 | 2 | 31,495 | 0.11 | 80.1 | 56 |
| 19269-38A | 0.00 | 950 | 10 | 11,954 | 0.09 | 89.0 | 45 |
| 19269-38B | 0.00 | 950 | 10 | 17,804 | 0.09 | 91.9 | 43 |
| 19269-44B | 1.50 | 950 | 10 | 32,550 | 0.13 | 93.4 | 100 |
| 19269-40B | 1.50 | 2080 | 10 | 19,803 | 0.09 | 93.7 | 83 |
| 19269-41A | 1.50 | 2080 | 10 | 9,756 | 0.07 | 74.6 | 23 |
| 19269-41B | 0.00 | 2080 | 10 | 14,778 | 0.12 | 91.9 | 56 |
| 19269-42A | 0.00 | 2080 | 10 | 9,147 | 0.08 | 86.1 | 62 |
| 19269-43A | 6.00 | 2080 | 10 | 40,454 | 0.16 | 79.6 | 83 |
| 19269-43B | 6.00 | 2080 | 10 | 16,619 | 0.08 | 83.7 | 39 |

Figure 6:
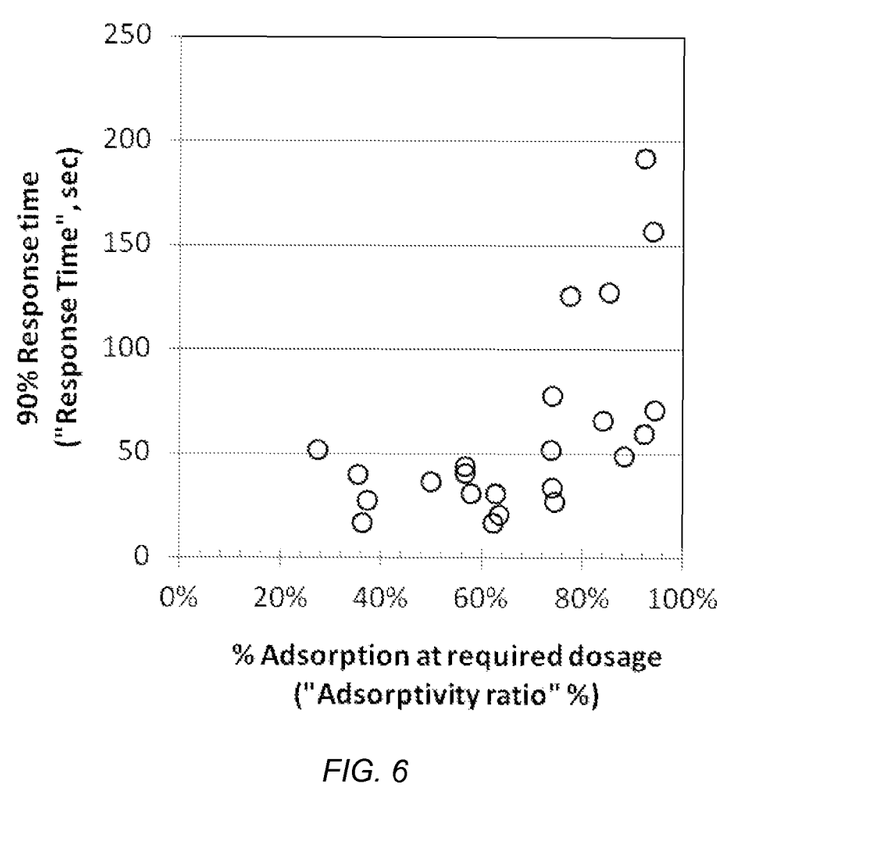
FIG. 6 is a graph illustrating the relationship between response time and percentage of PCE adsorbed at the required dosage (equivalent amount of PCE required for achieving 14% water cut in the concrete mix) of laboratory synthesized polymers.

FIG. 6 graphically illustrates the relationship between response time and absorptivity coefficient of various PCE polymers in terms of percentage adsorbed at the required dosage (for obtaining 14% water cut in a cementitious mix). The present inventors discovered that the fast responding PCE samples having less than 20 seconds of response time does not exist for PCEs having extremely high $A_c$ values. Thus, the present inventors believe that the present invention with its emphasize on $A_c$ values in the range of 40%-75% is a surprising and critical element for achieving fast response time.

While the mechanism details are unknown, and without being confined by theory, the inventors conjecture that advection of the cement paste portion within a concrete mix could be the primary driving force for dispersing and distributing PCE polymer within the mix and achieving faster effects on the fluidity of the concrete which could be attained in real world applications wherein slump monitoring systems are used on concrete delivery vehicles whereby the concrete load is ideally delivered by or before the mixer drum has completed a certain number of revolutions (e.g., 70-120).

Although a lower absorptivity coefficient favors faster response time, the lower absorption also results in higher dosage (required for achieving the standard 14% water cut in the concrete mix), which is not only uneconomical, but also may result in delayed slump gain over longer period time due to its overdose. Thus, the present inventors have inventively selected 40%-75% as the ideal cumulative absorptivity coefficient ($A_c$) for achieving balanced fast response time performance.

The present inventors have further analyzed the data and believe that certain features of PCE polymers are desirable for achieving the aforementioned cumulative absorptivity coefficient ($A_c$). For example, the length of the side chains of the PCE is important. In general, a shorter side chain length (e.g., shorter than 2,000 atomic mass units (AMU) appears favorable although there are exceptions. In addition, the molecular weight of the PCE polymer, as determined by GPC, also has an effect on response time. In general, it is believed that lower average number molecular weight is favorable for achieving faster response time. Peak molecular weight below 40,000 AMU also appears favorable for achieving fast response time.

A higher dosage of the PCE into the concrete mix also contributes to achieving faster response times. However, a higher dosage is not desired due to increased admixture costs. It would be desirable that the admixture has high dosage efficiency on the other hand, so that the desired fluidity can be accomplished at relatively lower absorptivity coefficients.

In further exemplary systems and methods of the invention, at least two PCE polymers are admixed into the concrete mix. In still further exemplary systems and methods, the present inventors believe that at least one of the PCE polymers can have an individual absorptivity coefficient that is greater than 75%, but that when combined with another PCE polymer having an lower individual absorptivity coefficient, it is possible that the cumulative absorptivity coefficient ($A_c$) can be adjusted to fall within their ideal 40%-75% range. Similarly, in other exemplary embodiments, the present inventors believe that it is possible that at least one of said PCE polymers has an individual absorptivity coefficient that is less than 40%, but when combined with one or more PCE polymers having a higher individual absorptivity coefficient, it is possible that the cumulative absorptivity coefficient ($A_c$) of the PCE polymers can be adjusted to fall within their ideal 40%-75% range.

In still further exemplary systems and methods of the invention, the present inventors envision that at least three PCE polymers can be admixed into the concrete mix, and that it may be possible that at least two of the three PCE polymers each have individual absorptivity coefficients greater than 75%, but by mixing with one or more other PCE polymers having much lower individual absorptivity coefficients, the cumulative absorptivity coefficient ($A_c$) can be adjusted to fall within their ideal 40%-75% range. In this regard, the present inventors also envision that at least three PCE polymers can be admixed into the concrete mix, wherein at least two of the three PCE polymers has an individual absorptivity coefficient that is less than 40%, but when combined with one or more PCE polymers having a higher individual absorptivity coefficient, it is possible that the cumulative absorptivity coefficient ($A_c$) of the PCE polymers can be adjusted to fall within their ideal 40%-75% range.

Hence, further exemplary embodiments of the present invention concern the use of two or more PCE polymers wherein at least one of the PCE components has an individual absorptivity coefficient which is above or below the 40%-75% range.

The absorption capability of PCE polymers is typically controlled by altering the ratio between (a) the anionic groups which adhere to the cement particles, and these are typically carboxylic, phosphoric, or phosphonic acids, and (b) the side chains containing polyoxyalkylene groups (e.g., ethylene oxide groups) which are sometimes referred to as "PEG" groups as these are typically derived from polyethylene glycol. The higher the acid amount, the higher the adsorption capability. A longer PEG side chain length generally allows lower acid amount without entirely defeating adsorption. The most direct approach to lowering absorptivity, however, is to lower the ratio of acid to ester groups within the side chain. However, if the acid/ester ratio is too low, the PCE becomes overly sensitive to cement types, the cementitious and filler powders used, and the ionic environment and alkalinity of the cementitious mixture.

The present inventors also believe that the degree or extent of cross-linking within the dispersant polymer structure is another approach to controlling the absorptivity coefficient of the polymer. The present inventors discovered that the introduction of cross-linking to a relatively slight degree can decrease the absorptivity of the molecule, without lowering the acid content and thus disturbing the acid/ester ratio within the polyoxyalkylene (cement dispersing) side chains, to position the absorptivity coefficient to within the ideal 40%-75% range envisaged by the present inventors, who believe that this can further help to control adsorption without unnecessarily increasing sensitivity of the PCE polymer to cement type. The cross linking within the polymer can be either permanent or transient.

In summary, the present inventors believe that having high efficiency in combination with controlled adsorption is the important attribute for PCE polymers to achieve fast response time in a practical, efficient manner. The ideal polymer has the lowest possible required dosage for the target workability with the adsorption coefficient in the 40% to 75% range, so that there is excess polymer available in the pore water even as the PCE polymer achieves high fluidity within the cementitious mix.

Exemplary comb-type polycarboxylate ether (PCE) polymers suitable for use in the present invention comprise carbon-containing backbone and pendant groups represented by structures (I) and (II) as represented by the structures below wherein each $R^1$ independently represents a hydrogen atom or a methyl group (—$CH_3$ group); M represents hydrogen atom, an alkali metal or an alkaline earth metal cation, ammonium or organic amine groups or a mixture thereof; Alk represents a $C_2$-$C_{10}$ alkylene group; p represents an integer of 0-1; x represents an integer of 1-10; γ represents a number of 0-300; z represents a number of 1-300: $R^2$ represents a hydrogen atom or a hydrocarbon group having 1-10 carbon atoms; and "a" and "b" are numerical values representing molar percentage of the polymer's structure, wherein "a" is 30-90 and "b" is 10-70; and Alternatively and/or optionally structures (III), (IV) and (V) shown below wherein $R_1$ represents a group selected from —C(O)O—, —C(O)NH—, —$CH_2$O—, —O—, —$(CH_2)_k$-Ø(R)$(CH_2)_k$—, or mixture thereof;

wherein $R_2$ represents a group selected from —C(O)O$^-$, —$SO_3^-$, —$PO_3^-$, —$OPO_3^-$, —$Si(OR)_3$, $OSi(OR)_3$, or mixture thereof; and wherein $R_3$ represents —C(O)O$^-$, —$CH_2$—C(O)—O$^-$, or mixture thereof; R represents hydrogen or a $C_1$-$C_3$ alkyl residue;

k represents an integer; and wherein "c" "d" and "e" are numerical values representing molar percentage of the polymer's structure, wherein "c" is "10-70", "d" is 0-90, and "e" is 0-90.

In addition to the monomers utilized in the above base comb-type polycarboxylate ether (PCE) polymers, any types of known cross-linking agents can be employed to control degree of cross-linking of the PCE polymers, as shown in the examples below.

While the invention is described herein using a limited number of embodiments, these specific embodiments are not intended to limit the scope of the invention as otherwise described and claimed herein. Modification and variations from the described embodiments exist. More specifically, the following examples are given as a specific illustration of embodiments of the claimed invention. It should be understood that the invention is not limited to the specific details set forth in the examples.

All parts and percentages in the examples, as well as in the remainder of the specification, are by percentage weight unless otherwise specified.

Example 1

Laboratory Synthesized Polymers

A. Measurement of Response Time

Measurement of response time is done through a cement mortar mixing test which is described as follows. The mortar mix has water/cement (w/c) ratio of Mortar 0.40, and the ratio of cement, sand, and water (C/S/W) is 1264/2700/506. The mortar mixes were prepared in 2-liter batches in a mixer with power (correlated to workability) measured over time. Predetermined amounts of cement dispersing PCE polymers were introduced to the mortar mix contained in the mixer after power consumption of the mixer was stabilized (indicating that the cement mortar was uniformly mixed together). The dispersant introduction quickly reduced the motor power. The power reduction was recorded using a lap top computer. A defoaming agent was used for all PCE-containing admixtures. Normalization of power over time curves were done by calculating the time required to reduce power consumption by 90%).

B. Synthesis of Polymers (Designated as Series 19213 and 19269)

Monomeric starting materials were obtained from Aldrich (Poznan, Poland). PCE polymers were prepared as copolymers of monomethoxypolyethyleneglycol methacrylate and acrylic acid with varied monomer ratio and varied amount of cross-linking agent, diethyleneglycol diacrylate. Different monomers were used to change the final structure of the polymer. Hence, conventional chain transfer agents were used to form comb-type PCE polymers designated as series 19213 and 19269 in Table 1 above) using the following: (1) for the forming the pendant side chains (or "teeth"): methoxypolyethylene glycol methacrylate ("MPEGMA") (having molecular weight of 2080 and 1000); (2) anionic monomer: acrylic acid ("AA"); and (3) as cross-linking agent: diethyleneglycol diacrylic acid ("DEGDA").

The polymers were prepared by a semi-batch process using a conventional radical polymerization in water. All polymers were prepared following the same procedure: In a 500 mL flask containing between 30 and 80 grams of water. One syringe was loaded with 20 grams of MPEGMA, the other monomers, mercaptopropionic acid as chain transfer agent (CTA) and 10 grams of water, and the other syringe containing 1 gram of ammonium persulfate as an initiator and 10 grams of deionized water. The two solutions were simultaneously added by syringe pump over the course of 1 hour at 70° C. under continuous agitation (80 rpm). The final product was tested without further purification.

The total water used was calculated to get a final total solid content of 20 wt. %.

A summary of the reagents used in formulating the polymers is provided in Table 2 below.

TABLE 2

Synthesis Recipe of various PCE Polymers

| | MPEG Mw | Acid/ester ratio | CTA (weight % of total mass) | DEDGA (mol %) | Initiator (g) |
|---|---|---|---|---|---|
| 19213-170A | 2080 | 5 | 0.8% | 0.0% | 1 |
| 19213-172B | 1100 | 2 | 0.6% | 0.0% | 1 |
| 19213-175B | 1100 | 2 | 0.6% | 1.5% | 1 |
| 19213-177B | 1100 | 2 | 0.6% | 6.0% | 1 |
| 19213-178A | 1100 | 2 | 0.6% | 10.0% | 1 |
| 19213-180B | 950 | 2 | 0.5% | 0.0% | 1 |
| 19213-181A | 950 | 2 | 0.5% | 3.0% | 1 |
| 19213-185A | 950 | 2 | 0.5% | 6.0% | 1 |
| 19213-186A | 950 | 2 | 0.3% | 6.0% | 1 |
| 19213-186B | 2080 | 5 | 0.8% | 1.5% | 1 |
| 19213-188A | 2080 | 5 | 0.4% | 1.5% | 1 |
| 19269-30B | 2080 | 5 | 0.5% | 0.0% | 1 |
| 19269-34B | 950 | 2 | 0.1% | 0.0% | 1 |
| 19269-38A | 950 | 10 | 1.0% | 0.0% | 1 |
| 19269-38B | 950 | 10 | 0.5% | 0.0% | 1 |
| 19269-40B | 2080 | 10 | 0.6% | 1.5% | 1 |
| 19269-41A | 2080 | 10 | 1.5% | 1.5% | 1 |
| 19269-41B | 2080 | 10 | 0.5% | 0.0% | 1 |
| 19269-42A | 2080 | 10 | 1.0% | 0.0% | 1 |
| 19269-43A | 2080 | 10 | 0.8% | 6.0% | 1 |
| 19269-43B | 2080 | 10 | 1.2% | 6.0% | 1 |
| 19269-44B | 950 | 10 | 0.6% | 1.5% | 1 |

C. Synthesis of Polymers, Series 19181 (Methallylsulfonate Method)]

Prescribed amounts of MPEGMA, sodium methacrylate (Na-MA) and sodium methallylsulfonate (SMAS) monomers were charged in a four-neck flask fitted with a mechanical stirrer, thermocouple, using nitrogen inlet and reflux condenser. The SMAS was used as a molecular weight controlling agent. Slow nitrogen gas flow was started, and the monomer solution was heated to 60 degrees Celsius. 20% by weight of ammonium persulfate was added by funnel for one minute period. The reaction temperature was held at 60 degrees Celsius (plus/minus 2 degrees) for 3.5 hours. The reaction mixture was allowed to cool to room temperature. The solution was used in the mortar test as-is.

The molar ratios of the monomers used in this example are summarized in Table 3 below.

TABLE 3

Synthesis recipe of the dispersant polymers (2)

| | | Molar ratio | | | | |
|---|---|---|---|---|---|---|
| | MPEGMA Mw | MPEGMA | Na-MA | SMAS | DEGDMA | APS |
| 19181-101 | 1100 | 0.0909 | 0.623 | 0.202 | none | 0.0175 |
| 19181-103 | 1100 | 0.0909 | 0.623 | 0.202 | 0.0076 | 0.0175 |
| 19181-109 | 1100 | 0.0909 | 0.623 | 0.202 | 0.0152 | 0.0175 |
| 19181-110 | 1100 | 0.0623 | 0.623 | 0.202 | none | 0.0175 |
| 19181-111 | 1100 | 0.0623 | 0.623 | 0.202 | 0.0052 | 0.0175 |

D. Polymer Characterization
   Absorption Isotherm.

Adsorption of chemical fluidizing admixture on cement was measured in accordance with available literature using the Total Organic Carbon ("TOC") method (See e.g., Ferrari et al., Journal of Colloid and Interface Science, 347(2010) 15-24). For each dispersant dose investigated, 16 g of cement was first introduced into a centrifuge tube, followed by the addition of 6.4 g of a solution of the admixture with deionized water (18.2 MΩ·cm) to obtain a water/cement ratio of 0.4. The concentrations of admixtures were chosen to investigate doses of 0.03, 0.06, 0.08, 0.1, 0.12, 0.15 and 0.2 percent by dry weight based on weight of cement (for example, 0.03% required a 0.75 g/L solution of admixture). The tube was then shaken for two minutes in a VWR Vortex Mixer 444-1372(EU). Approximately two (2) grams of the supernatant was separated using a 0.45-μm filter and accurately weighed in a 50 mL tube. Next, two grams of HCl (0.8%) was added, and the tube was filled with deionized water to achieve a final weight of 40 grams.

In parallel, a sample was prepared only with admixture solution, using the same procedure as described above, i.e. 2 grams of HCl (0.8%) making up total weight to 40 grams. The amount of the pure solution was exactly the same as the amount of the supernatant tested previously.

One additional blank solution was prepared, using only deionized water and cement instead of the admixture solution, still using the same procedure, i.e. two grams of HCl (0.8%) and filling with deionized water to constitute 40 grams.

The TOC content was analyzed on an Elementar™ High TOC II measuring device, and the quantity of polymer adsorbed by cement was determined for each dose by using the following formula:

$$\text{Percentage adsorbed} = (TOC - TOC_{ref})/TOC_{ref}$$

where TOC represents the Total Organic Carbon measured for the supernatant minus the blank ($TOC = TOC_{supernatant}$ minus $TOC_{blank}$); and $TOC_{ref}$ is the Total Organic Carbon measured for the pure solution of admixture.

E. Gel Permeation Chromatography (GPC)

GPC Chromatograms were recorded with the following program: (1) columns: Waters Ultrahydrogel Guard™ Column, Waters Ultrahydrogel™ 1000, Waters Ultrahydrogel™ 250, and Waters Ultrahydrogel™ 120; (2) Detector: RI; (3) mobile phase: 1% potassium nitrate; (4) Flow rate: 0.6 mL/min; (5) run time: 100 min; and using (6) polyethyleneglycol standards.

Example 2 (Commercially Available Polymers)

Similarly to the above laboratory polymers, several commercial polymers were also tested for the response time and the absorptivity coefficient. Table 4 shows the results.

TABLE 4

| Polymer (sample designation number illustrated in FIG. 7) | Dose for 14 W Reduction (% s/s) | % Adsorbed at the dose | 90% Power Reduction (sec) |
|---|---|---|---|
| 2 | 0.08 | 57.8 | 39 |
| 1 | 0.08 | 71.7 | 85 |
| 5 | 0.19 | 21.5 | 19 |
| 3 | 0.13 | 44.2 | 59 |
| 4 | 0.12 | 35.1 | 39 |

Figure 7:
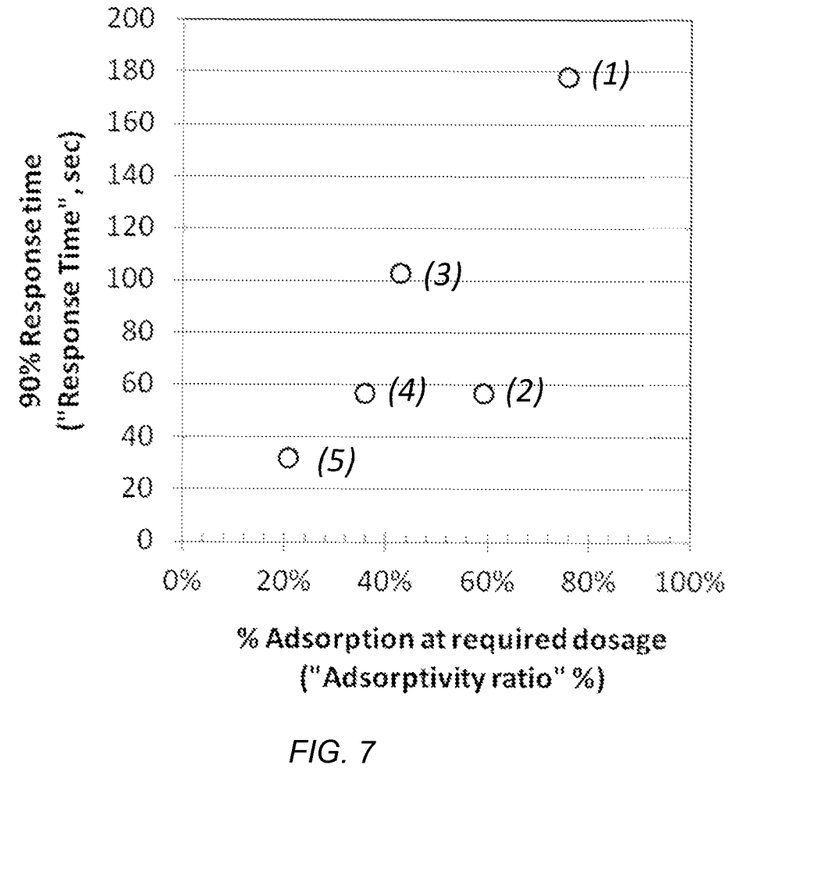
FIG. 7 is a graph illustrating the relationship between response time and percentage of various commercial PCE polymer cement dispersants (dosage equivalent for achieving 14% water cut in the concrete mix)

FIG. 7 shows the relationship between the response time and absorptivity coefficient of some commercially available PCE cement dispersants. Similar to the laboratory synthesized polymers, the general trend of lower absorptivity and faster response time can be observed. The fastest polymer is designated as "(5)" in FIG. 7. However, as can be seen in Table 4, the required dosage for achieving the target workability is significantly higher compared to the other PCE samples. Therefore, the present inventors do not believe this sample polymer is suitable when used alone for achieving fast response time in accordance with the objectives of the present invention.

On the other hand, PCE Sample "1" seemed to have an acceptable dosage efficiency, but, on the other hand, the response time for this sample was seen to be very slow in comparison to the others, as shown in FIG. 7. Therefore, the present inventors do not believe this sample polymer is suitable when used alone for achieving suitable fast response time in accordance with the objectives of the present invention.

Figure 8:
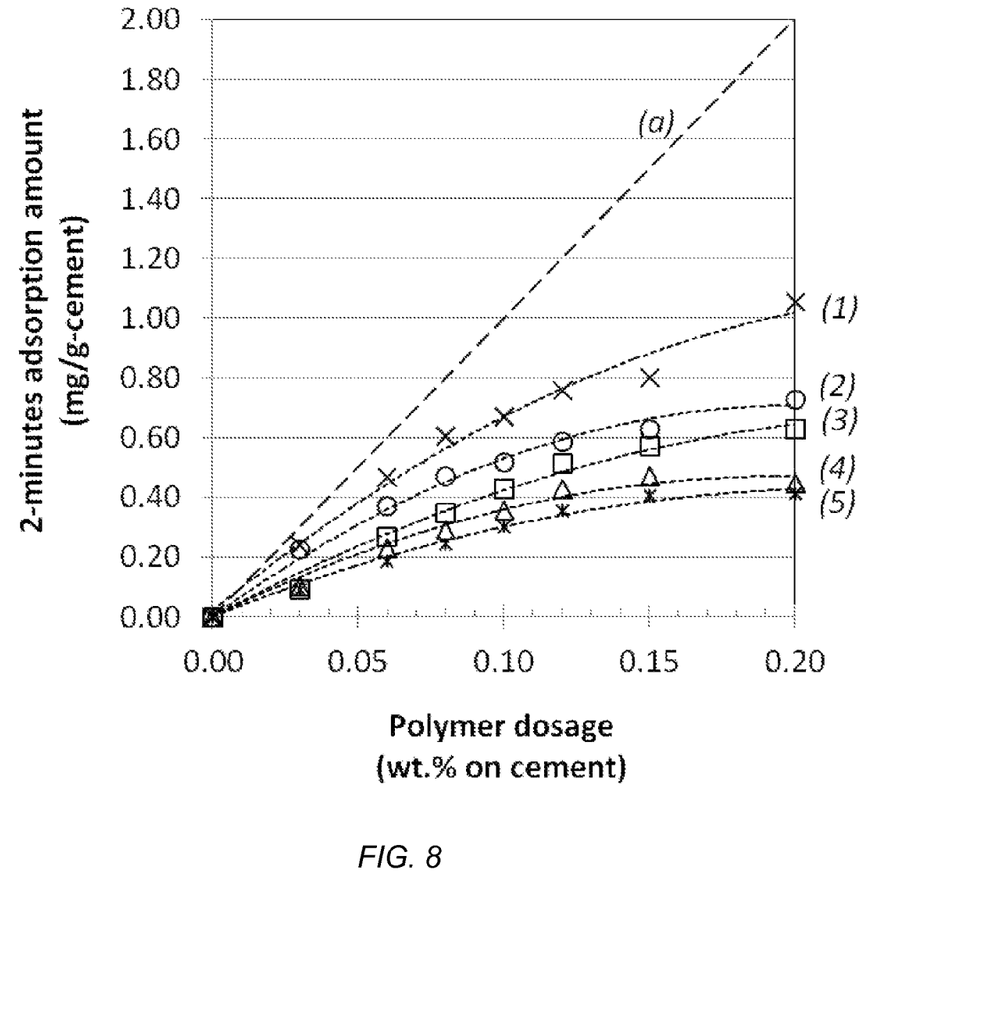
FIG. 8 is a graph illustrating the relationship between adsorption of PCE polymer after two minutes mixing of laboratory sample in cement mix (vertical axis) as a function of PCE polymer dosage by weight percentage based on weight of cement.

Sample PCE designated "2" appeared to demonstrate both a balanced dosage efficiency and a response time within the scope of the present invention. The polymer dosage behavior of the various sample PCE polymers 1-5, as a function of the adsorption rate at 120 seconds (after complete mixing of PCE, cement, and water), is graphically illustrated in FIG. 8.

The foregoing illustrations and examples are provided for illustrative purposes only and not intended to limit the scope of the invention.

It is claimed:

1. A system for achieving and monitoring fast response time of chemical fluidizing admixture in a hydratable concrete mix, comprising:
    a rotatable mixer drum for containing a hydratable concrete mix;
    a system for continuous monitoring of slump of the hydratable concrete mix contained in the rotatable mixer drum and for dispensing controlled amounts of fluidizing chemical admixture into the concrete mix within the drum based on the continuous monitoring; and
    a fluidizing chemical admixture to be dispensed by the system into the hydratable concrete mix contained in the rotatable mixer drum, the admixture comprising at least one comb-type polycarboxylate ether polymer for modifying slump of the concrete mix (the one or more comb-type polycarboxylate ether polymer or polymers being hereinafter referred to as "PCE"), the PCE having a cumulative absorptivity coefficient ($A_c$) of 40%-75% as determined by a depletion method whereby a sample of the PCE is charged into an aqueous cement slurry containing the cement used for making the hydratable concrete mix, the aqueous cement slurry being separated after 120 seconds mixing of the PCE-containing aqueous cement slurry to obtain supernatant pore water, in accordance with the formula $$A_c = [(A-B)/A] \times 100$$

wherein
    A represents the total amount of PCE added to the aqueous cement slurry before separation to obtain the supernatant pore water,
    B represents the amount of the PCE remaining in the supernatant pore water obtained by separation from the aqueous cement slurry after 120 seconds mixing, and wherein absorptivity is measured at 25° Celcius on the supernatant pore water separated from the aqueous cement slurry after 120 seconds mixing of the aqueous cementitious slurry containing the cement, water, and PCE, wherein water/cement ratio of the slurry is 0.4 and the amount of the PCE dosed into the aqueous cementitious slurry is between 0.03%-0.5% by dry weight based on cement and is calculated by mortar test whereby dosage for the PCE is that which would provide the same fluidity as adding 14% additional water into the aqueous cementitious slurry; and
    wherein
    the slump monitoring system is programmed to monitor on a continuous basis and to adjust slump by introducing fluidizing chemical admixture containing the PCE having the cumulative absorptivity coefficient ($A_r$) into the concrete load and performing monitoring and adjustment steps in iterative fashion during transit or after arrival at the delivery site where the concrete mix is poured into place.

2. The system of claim 1 wherein the cumulative adsorption coefficient of the PCE is 50%-60%.

3. The system of claim 1 wherein at least two PCE polymers are admixed into the concrete mix.

4. The system of claim 3 wherein at least one of said PCE polymers has an individual absorptivity coefficient that is greater than 75%.

5. The system of claim 3 wherein at least one of said PCE polymers has an individual absorptivity coefficient that is less than 40%.

6. The system of claim 1 wherein at least three PCE polymers are admixed into the concrete mix, and wherein at least two of the three PCE polymers has an individual absorptivity coefficient that is greater than 75%.

7. The system of claim 1 wherein at least three PCE polymers are admixed into the concrete mix, and wherein at least two of the three PCE polymers has an individual absorptivity coefficient that is less than 40%.

8. Method for achieving fast response time of a polycarboxylate ether polymer in a concrete mix, comprising:
    providing a rotatable mixer drum for containing a hydratable concrete mix;
    providing a system for continuous monitoring of slump of the hydratable concrete mix contained in the rotatable mixer drum and for dispensing controlled amounts of fluidizing chemical admixture into the concrete mix within the drum based on the continuous monitoring; and
    providing a fluidizing chemical admixture to be dispensed by the system, the admixture comprising at least one comb-type polycarboxylate ether polymer for modifying slump of the concrete mix (the one or more comb-type polycarboxylate ether polymer or polymers being hereinafter referred to as "PCE"), the PCE having a cumulative absorptivity coefficient ($A_c$) of 40%-75% as determined by a depletion method whereby a sample of the PCE is charged into an aqueous cement slurry containing the cement used for making the hydratable concrete mix, and mixed together and separated after 120 seconds continuous mixing of the aqueous cement slurry to obtain supernatant pore water, in accordance with the formula $$A_c = [(A-B)/A] \times 100$$

wherein
    A represents the total amount of PCE added to the aqueous cement slurry which was then separated to obtain the supernatant pore water, B represents the amount of the PCE remaining in the supernatant pore water obtained by separation from the aqueous cement slurry, and wherein absorptivity is measured at 25° Celcius on the supernatant pore water separated from the aqueous cement slurry after 120 seconds continuous mixing of the aqueous cementitious slurry containing the cement, water, and PCE, wherein water/cement ratio of the slurry is 0.4 and the amount of the PCE dosed into the aqueous cementitious slurry is between 0.03%-0.5% by dry weight based on cement and PCE dosage used is calculated by mortar test whereby dosage for the PCE is that which would provide the same fluidity as adding 14% additional water into the aqueous cementitious slurry; and further wherein the slump monitoring system is programmed to monitor on a continuous basis and to adjust slump by introducing fluidizing chemical admixture containing the PCE having the cumulative absorptivity coefficient ($A_c$) into the concrete load and performing monitoring and adjustment steps in iterative fashion during transit or after arrival at the delivery site where the concrete mix is poured into place.

9. The method of claim 8 further comprising dosing the admixture into the concrete mixer drum containing the hydratable concrete mix.

10. The system of claim 1 wherein the system for continuous monitoring of slump of the hydratable concrete mix contained in the rotatable mixer drum and for dispensing controlled amounts of fluidizing chemical admixture into the concrete mix within the drum based on the continuous monitoring, comprises a sensor selected from the group consisting of hydraulic pressure sensor, electromechanical sensor, or combination thereof.

11. The system of claim 8 wherein the system for continuous monitoring of slump of the hydratable concrete mix contained in the rotatable mixer drum and for dispensing controlled amounts of fluidizing chemical admixture into the concrete mix within the drum based on the continuous monitoring, comprises a sensor selected from the group consisting of hydraulic pressure sensor, electromechanical sensor, or combination thereof.

* * * * *